United States Patent Office 3,792,046
Patented Feb. 12, 1974

3,792,046
PROCESS OF PREPARATION OF 16β-METHYL-9α-FLUORO-STEROIDS
Ivan Villax, 3 Travessa do Ferreiro, Lisbon, Portugal
No Drawing. Filed Aug. 7, 1972, Ser. No. 278,394
Claims priority, application Portugal, Dec. 13, 1969, 52,923
Int. Cl. C07c *173/00*
U.S. Cl. 260—239.55 R            9 Claims

ABSTRACT OF THE DISCLOSURE

Process for preparing betamethasone and its 21-ester derivatives by simultaneously 11β-hydroxylating and 9-brominating 16β-methyl-17α-hydroxy-1,4,9(11)-pregnatriene-3,20-dione, dehydrobrominating the resultant 16β-methyl-9α-bromo-11β,17α-dihydroxy - 1,4 - pregnadiene-3,20-dione in an alkaline medium to obtain the 9,11-epoxy compound, fluorinating the epoxy compound to yield 16β-methyl-9α-fluoro-11β,17α-dihydroxy-1,4-pregnadiene-3,20-dione, diiodinating the latter compound at the 21-position, acylating the 21-diiodo compound to produce the 21-acylate, and hydrolyzing the acylate.

---

This application is a continuation-in-part of Ser. No. 98,202, filed Dec. 14, 1970, now abandoned.

Since the 16β-methyl corticosteroids are today, both pharmacologically and clinically the most active corticosteroids, their preparation, especially that of the fluorinated steroids is of primary importance. The most relevant compounds of this latter group are 16β-methyl-9α-fluoro-11β,17α,21-trihydroxy - 1,4 - pregnadiene-3,20-dione (betamethasone) and its derivatives esterified at the 21-position (referred to as C21-). Betamethasone is recognized as an antiinflammatory and antiallergic agent. The 21-esterified products of betamethasone are useful for the same purpose and can be administered in the same manner and dosage as is betamethasone.

Betamethasone was first described by Taub et al. (Journ. Am. Chem. Soc., vol. 80, p. 4435, 1958) and in a detailed manner (ibid vol. 82, p. 4012, 1962), and by Oliveto et al. (ibid vol. 80, p. 6688, 1958). Portuguese Pat. No. 36,478 of Dec. 19, 1959 of the present inventor describes a process for preparing betamethasone. U.S. Pat. Nos. 3,053,865 (1962) of Taub et al., 3,104,246 (1963) of Amiard et al. and 3,164,618 (1964) of Rausser et al., and the publication of R. Rausser et al. (Journ. Org. Chem., vol. 31, p. 26, 1966) also described different processes for preparing betamethasone and its intermediates.

Considering the various technical difficulties and the great number of reactions involved in the above-mentioned processes, it was found essential to join all efforts with a view to discovering a shorter or more economical procedure by which to prepare betamethasone and its carboxylic 21-esters with higher intermediate and final product yields.

The present invention relates to a new method which is very economical and provides high yields, for the preparation of the 21-alcohol and the 21-acylates of betamethasone, the intermediates III, IV and VI therein used being novel compounds.

All processes described thus far show the introduction of the fluorine atom at C9- in the compound already hydroxylated at C21-, in view of the fact that hydroxylation of the 9α-fluoro-11β-hydroxy-steroids at C21- presents considerable difficulties. These difficulties have been overcome so far by using, in certain similar cases, the 21-hydroxylation by a microbiological route. This process is however, slow, expensive and of low yield.

The advantage of the present process over those previously known is based on the following facts.

(a) The preparation of the 9(11)-epoxy derivatives is carried out in the absence of the hydroxyl group at C21-, which permits to obtain almost quantitative yields (92.6% in Example 2) due to the fact that the steroids not hydroxylated at C21- are more stable than the 21-hydroxy derivatives in an alkaline medium, which is essential for the preparation of these epoxides.

(b) This process accomplishes, for the first time, the 21-hydroxylation, by chemical route, of the 16β-alkyl-9α-fluoro-11β-hydroxy-steroid derivatives, and with a very high yield.

One of the features of the present invention is that it accomplishes, with an almost quantitative yield, the 21-hydroxylation of 16β-methyl - 9α - fluoro-11β,17α-dihydroxy-1,4-pregnadiene-3,20-dione, as well as the preparation of this latter compound.

In accordance with the present invention, a process is also provided which affords, in an unexpected manner, the direct diiodination of 16β-methyl-9α-fluoro-11β,17α-dihydroxy-1,4-pregnadiene-3,20-dione, yielding a new compound, the 21-diiodo derivative.

The reaction of the 21-diiodo compound with a sodium or potassium salt of a carboxylic acid results in a 21-monoacylated product in spite of the fact that both iodine atoms at C21- are eliminated. Most surprising is the fact that the reaction occurs likewise when the 21-hemiacylates of dicarboxylic acids are prepared.

A yield never attained thus far is obtained by applying the 21-diiodination and subsequent deiodination sequence by means of salts of a carboxylic acid, resulting in the introduction of the 21-monohydroxy group in the form of acylates, which is performed in the series of the 16β-alkyl-9α-fluoro-11-hydroxy-steroids.

The yields of the various processes relating to hydroxylation at C21- and fluorination at C9- are compared hereafter, by way of illustration.

The process of Taub et al. in "Journal of the American Chemical Society," cited above, indicates a stoichiometric yield of 77% for hydroxylation at C21- (Compounds 25 and 26) and 55.5% for fluorination until the impure 21-acetate of betamethasone is obtained (Compounds 44, 45a, 45b, 46b). The yield given in U.S. Pat. No. 3,104,246 for hydroxylation is 85% (Example IV) and for fluorination, according to Example V, it refers to the publication of Taub et al. (thus the yield is 55.5%). U.S. Pat. No. 3,164,618 indicates a yield of 58.5% (Examples 1E and F) for hydroxylation and 15.7% (Examples 17B, 18A and B) for fluorination. The publication in "Journal of Organic Chemistry," cited above, indicates a yield of 72.5% for hydroxylation (Compound XIIIa and b) and 55% for fluorination (Compounds XVIII, XIX, XXa, XXb). The fluorination is carried out in the present invention with a yield of 73.1% (Examples 1, 2 and 3) before introduction of the hydroxylation group at C21-, the yield of this latter compound being 86.6% (Examples 5 and 6). Thus, the stoichiometric overall yields for the two phases, until the 21-acetate of betamethasone is obtained, are as follows:

| | Percent |
|---|---|
| Present invention | 63.3 |
| Taub et al. | 42.6 |
| U.S. Pat. 3,104,246 | 47.2 |
| U.S. Pat. 3,164,618 | 9.18 |
| Rausser et al. | 40.3 |

The present process relates therefore to the preparation of the compounds of the formula

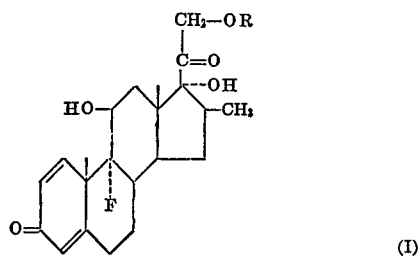

(I)

where R is a hydrogen atom, an acyl group or a carboxylacyl group, and salts thereof, e.g. alkali and alkaline earth metal salts. R is preferably limited to 2 to 28 carbon atoms, most preferably 2 to 10 carbon atoms. Examples of the salts are sodium and calcium salts.

The raw material used in the present process, 16β-methyl-17α-hydroxy-1,4,9(11) - pregnatriene-3,20-dione, has the formula

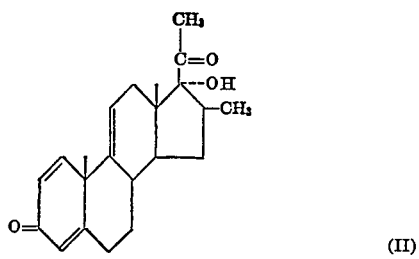

(II)

and was first described by Amiard et al. (loc. cit.).

The aforesaid raw material is hydroxylated at position 11β- and simultaneously brominated at C9- by known procedures, such as "hydroxybromination" with N-bromosuccinimide or N-bromoacetamide in the presence of aqueous perchloric acid in an inert solvent such as dioxane, tetrahydrofuran, at a temperature between −15° C. and +35° C. for 1-6 hours, yielding the novel compound 16β-methyl-9α-bromo - 11β,17α - dihydroxy-1,4-pregnadiene-3,20-dione of the formula

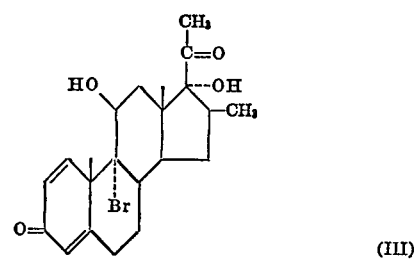

(III)

The compound III is then dehydrobrominated in an alkaline medium by a conventional procedure, such as treatment with an aqueous or methanolic solution of potassium or sodium hydroxide or bicarbonate, or by means of sodium methoxide, in an inert solvent such as methanol, ethanol, dichloroethane, chloroform or a mixture thereof, and preferably in an inert atmosphere, such as nitrogen, yielding the novel compound 16β-methyl-9,11-epoxy-17α-hydroxy-1,4-pregnadiene - 3,20 - dione of the formula

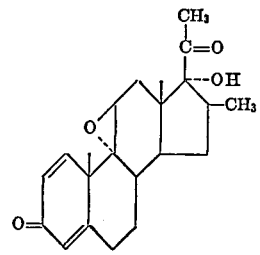

(IV)

with almost quantitative yield. The reaction temperature is preferably from 0 to 25° C., with a reaction time of 1–4 hours. The essential reason accounting for the high yield is the lack of substitution at C21-, which renders the molecule much more stable in the alkaline medium where the dehydrohalogenation reaction takes place.

In the next step, Compound IV is fluorinated by a known procedure in an inert medium such as by intimate contact with a solution of anhydrous hydrofluoric acid in dichloromethane, chloroform, tetrahydrofuran, dimethylformamide, or with an aqueous solution of hydrofluoric acid of a concentration not less than 60%, at a temperature between −70° C. and 0° C. for 1–5 hours, yielding the compound 16β - methyl-9α-fluoro-11β,17α-dihydroxy-1,4-pregnadiene-3,20-dione of the formula

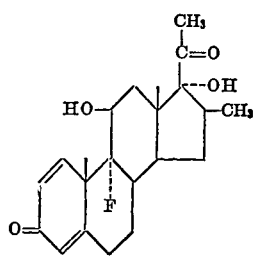

(V)

Compound V, e.g. in the form of a methanolic suspension, is then diiodinated at C21- in an inert medium, e.g. by means of a solution of elementary iodine in methanol, in the presence of calcium chloride and an alkaline earth metal oxide, e.g. calcium oxide, yielding the novel compound 16β-methyl-9α-fluoro - 11β,17α - dihydroxy-21,21-diiodo-1,4-pregnadiene-3,20-dione of the formula

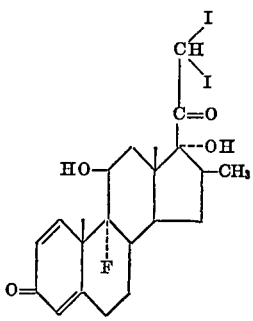

(VI)

with almost quantitative yield. The reaction temperature is preferably from 24 to 28° C., with a reaction time of 1–2 hours. The reaction occurs smoothly without any side reactions.

The acylation of Compound VI by means of alkali and alkaline earth metal salts, e.g. potassium, calcium or sodium salts, of carboxylic acids, according to known procedures, in an inert medium, e.g. acetone, aqueous acetone, dimethylformamide, diethylformamide, acetonitrile or a mixture thereof, occurs without any difficulty, yielding the 21-acylates of betamethasone, such as the 21-acetate from which betamethasone can be obtained by simple hydrolysis, as known. The reaction temperature is up to the boiling point of the solvent, and preferably at the boiling point, with a reaction time of 2–4 hours.

Consequently, the present invention also provides a process for the preparation of novel Compounds III, IV and VI which are useful intermediates in steroid chemistry, in the preparation of betamethasone and 21-acylates thereof. Among the 21-acylates, we have found the 21-nicotinate, which possesses surprising and unexpected properties of pharmacological behaviour. It is absorbed by the skin two times more efficiently than the 17-valerate of betamethasone, thus it represents another feature of the present invention.

The reaction conditions and isolation of the products are largely described, by way of illustration, in the following examples, which however are not intended to limit the scope of the present invention.

EXAMPLE 1

69.9 g. of 16$\beta$ - methyl - 17$\alpha$-hydroxy-1,4,9(11)-pregnatriene-3,20-dione—melting point 168°–170° C., $E_{1cm.}^{1\%}$ 435 at 239–240 m$\mu$ is added to 812 cc. tetrahydrofuran and 433.8 cc. diluted perchloric acid (27.6 cc. 70% perchloric acid diluted with water to make 1000 cc.). The reaction mixture is cooled to +15° C. and 36.99 g. N-bromoacetamide is added, causing an increase in the temperature of about 5° C. It is then stirred for 4 hours at a temperature of 25°–30° C. The reaction mixture is quenched by addition of a few drops of an aqueous solution of sodium bisulfite. The desired 16$\beta$ - methyl - 9$\alpha$ - bromo-11$\beta$,17$\alpha$-dihydroxy-1,4-pregnadiene-3,20-dione, a novel product, precipitates by addition of the reaction mixture to 4 litres of water and ice. The crude product, when washed with water and dried at 40° C., weighs 85.8 g., having a melting point of 157°–158° C., specific rotation [$\alpha$]$_D$+120 (c.=1 in dioxane), $E_{1cm.}^{1\%}$ value being 308 at 243 m$\mu$ in methanol. The product is soluble in dioxane, slightly soluble in ethyl acetate and insoluble in ether and water, the principal peaks of the infrared absorption curve being at 2.9$\mu$, 5.84$\mu$, 6.02$\mu$, 6.16$\mu$, 9.6$\mu$, 9.98$\mu$ and 11.3$\mu$.

Analysis. — $C_{22}H_{29}O_4Br$=437.4. Calculated: Br, 18.26%. Found: Br, 18.37%.

EXAMPLE 2

85.3 g. of the crude product obtained in the previous example is suspended in 1.011 litres methanol, 674.3 cc. chloroform is added, followed by the dropwise addition of 200.28 cc. of a normal solution of sodium hydroxide, during 25 minutes, under stirring and nitrogen atmosphere at a temperature between 0° and +3° C. After stirring for 3 hours, the reaction mixture is neutralized with 50% aqueous acetic acid and concentrated under vacuum until a crystalline slurry is obtained. The product is then precipitated by addition of 1.390 cc. of water and ice, yielding 64.4 g. of the desired new product 16$\beta$-methyl-9,11-epoxy-17$\alpha$ - hydroxy - 1,4 - pregnadiene-3,20-dione, which has a melting point of 186°–191° C., specific rotation [$\alpha$]$_D$+50 (c.=1 in dioxane), $E_{1cm.}^{1\%}$ 400 at 249–250 m$\mu$ in methanol. Stoichiometric yield: 92.6%. The product is soluble in dioxane and chloroform, slightly soluble in acetone and insoluble in ethyl and isopropyl ether and water. The principal peaks of the infrared absorption curve are at 2.96$\mu$, 5.84$\mu$, 6.02$\mu$, 6.16$\mu$, 6.2$\mu$ (shoulder), 8.3$\mu$, 9.47$\mu$, 10.03$\mu$, 11.2$\mu$ and 11.57$\mu$.

Analysis.—$C_{22}H_{48}O_4$=356.44. Calculated: C, 74.13%; H, 7.92%. Found: C, 73.92%; H, 7.88%.

EXAMPLE 3

52 g. of the product obtained in the previous example is added in small fractions, during 20 minutes, to 365 cc. hydrofluoric acid diluted with dimethylformamide (60%) and cooled to −20° C. The reaction mixture is stirred during 3.5 hours at −16° to −18° C. and is poured into a mixture of 4.8 kg. of ice, 960 cc. of water and 921 cc. of concentrated ammonia. The product is filtered, washed several times with water until it contains no inorganic salts, and then dried, yielding 56.5 g. of the desired product 16$\beta$ - methyl - 9$\alpha$ - fluoro - 11$\beta$,17$\alpha$ - dihydroxy-1,4-pregnadiene-3,20-dione in an impure state. The product, thus obtained, is pulverized and recrystallized from chloroform, yielding the product in the form of a chloroform solvate. The chloroform of crystallization is eliminated by heating to 105° C., yielding 44.3 g. of the product. Yield: 82.4%. The final product has a melting point of 230°–234° C., specific rotation [$\alpha$]$_D$+100±10 (c.=1 in dioxane), $E_{1cm.}^{1\%}$ 404 at 239 m$\mu$. It is moderately soluble in methanol, slightly soluble in dichloromethane and chloroform and insoluble in ethyl and isopropyl ether and water. The principal peaks of the infrared absorption curve in mineral oil mull are at 2.98$\mu$, 5.82$\mu$, 6.01$\mu$, 6.16$\mu$, 6.21$\mu$, 10.13$\mu$, 10.43$\mu$ and 11.1$\mu$. This curve differs substantially from that of the solvate.

Analysis.—$C_{22}H_{29}O_4F$=376.45. Calculated: C, 70.18%; H, 7.76%; F, 5.05. Found: C, 70.2%; H, 7.81%; F, 4.91%.

EXAMPLE 4

The procedure of the previous example is followed, but instead of a 60% solution of hydrofluoric acid in dimethylformamide, 80% aqueous hydrofluoric acid is used. The final yield is 43.4 g. of product identical to that obtained in Example 3.

EXAMPLE 5

14 g. of the product obtained in Example 4 is added to a mixture of 56 cc. absolute methanol and 14 cc. of a 10% methanolic solution of anhydrous calcium chloride, the reaction temperature being between +25° and +27° C. After stirring for 5 minutes, 7 g. calcium oxide powder is added, and stirring continued for 25 minutes more. It is then added to a solution containing 18.8 g. resublimed iodine in 42 cc. of a 10% methanolic solution of anhydrous calcium chloride and 28 cc. absolute methanol, under nitrogen atmosphere in the dark, at a temperature between 25°–27° C., the addition speed being set according to the discoloration of the solution added. It is stirred for 15 minutes more, cooled to −10° to −12° C., and stirring is continued for half an hour at that temperature. The product is then precipitated by addition of 1500 cc. of water and ice containing 15 cc. acetic acid. It is stirred for 1 hour, the precipitate is filtered, washed and dried under vacuum. The yield of the desired new product 16$\beta$-methyl - 9$\alpha$ - fluoro - 11$\beta$,17$\alpha$ - dihydroxy-21,21-diiodo-1,4-pregnadiene-3,20-dione is 20.6 g., having a humidity content of 4.9%. Yield: 100%. After washing with methanol, the product has a melting point of 164°–166° C. with decomposition. The infrared absorption curve in mineral oil shows principal peaks at 2.9$\mu$, 5.85$\mu$, 6.01$\mu$, 6.18$\mu$, 6.22$\mu$, 8.26$\mu$, 9.37$\mu$, 9.5$\mu$, 11.1$\mu$ and 11.22$\mu$.

EXAMPLE 6

9.2 g. of the product of the previous example is added to a mixture of 91.08 cc. acetone, 0.92 cc. water, 0.92 cc. acetic acid and 9.2 g. anhydrous potassium acetate. It is refluxed for 1 hour and 30 minutes in the dark under nitrogen atmosphere. It is cooled to 55° C., and after stirring for 5 minutes it is precipitated by addition of 730 cc. water and ice, yielding 6.2 g. of the desired betamethasone acetate. Yield: 86.6%. Recrystallization from acetone yields the pure product, having a melting point of 218°–220° C., specific rotation [$\alpha$]$_D$+125 (c.=1 in dioxane), $E_{1cm.}^{1\%}$ 366 at 238 m$\mu$.

EXAMPLE 7

67 g. of the product prepared according to Example 6 is added to 250 cc. methanol, followed by addition of 45 cc. 2 N methanolic sodium methoxide. After 10 minutes, a further amount of 18 cc. 2 N sodium methoxide is added, and at the end of 20 minutes it is neutralized with 50% aqueous acetic acid. After precipitating with water, 57.1 g. betamethasone is obtained. Yield: 96.4%. After recrystallizing from ethyl acetate, the melting point is 232°–234° C., whereas when recrystallizing from acetone it melts at 245° C. The product so obtained is identical to that described in the literature.

EXAMPLE 8

By substituting the potassium acetate of Example 6 by potassium-valerate, -isovalerate, -palmitate, in a mole/mole equivalent amount, and repeating the reaction described in Example 6, the respective 21-valerate, 21-isovalerate and 21-palmitate of betamethasone are obtained.

EXAMPLE 9

By repeating Example 6, but using the monopotassium salt of succinic acid, and adjusting the pH of the reaction mixture to 6.0 with triethylamine, the 21-hemisuccinate of betamethasone is obtained, which yields, after isolation and neutralization of the free carboxylic group with sodium hydroxide, the 21-hemisuccinate of betamethansone in the foam of a sodium salt.

EXAMPLE 10

By repeating Example 6, but using 9.2 g. anhydrous potassium nicotinate instead of potassium acetate, betamethasone 21-nicotinate is obtained with a yield of 81.2%. Subsequently, an ointment is prepared with the product thus obtained:

| | Percent w./w. |
|---|---|
| Betamethasone 21-nicotinate | 0.1 |
| Liquid paraffin | 10 |
| Whit soft paraffin as to prepare 100 parts by weight. | |

The active ingredient is mixed with one third of the amount of liquid paraffin in a porcelain ball-mill and milled until the particle size is reduced for an average of 3–4μ. The paste thus obtained is diluted and washed out with the remaining liquid paraffin and incorporated into the soft paraffin previously liquified by heating to 55° C. in a water-bath. Subsequently, it is let to cool down slowly, under stirring, to achieve homogenicity of the onitment. This ointment has been compared with an ointment of the same composition containing betamethasone 17-valerate of the same concentration. In the kaolin foot edema test in rats (12 in each group), the absorption of the betamethasone 21-nicotinate was in average 1.87 times faster than that of the valerate.

I claim:

1. A process for preparing a compound of the formula

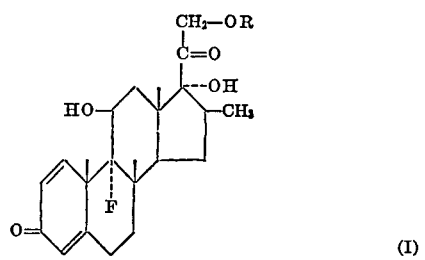

(I)

wherein R is hydrogen, acyl of 2–16 carbon atoms, hemisuccinyl or nicotinyl, which comprises (a) simultaneously brominating and hydroxylating 16β-methyl - 17α - hydroxy-1,4,9(11)-pregnatriene-3,20-dione in an inert solvent by reaction with N-bromosuccinimide or N-bromoacetamide in the presence of aqueous perchloric acid to obtain 16β-methyl - 9α - bromo - 11β,17α - dihydroxy - 1,4 - pregnadiene-3,20-dione, (b) dehydrobrominating the product of step (a) by reacting the product with an alkaline substance selected from the group consisting of potassium hydroxide, sodium hydroxide, potassium bicarbonate, sodium bicarbonate and sodium methoxide in an inert solvent to otbain 16β-methyl-9,11-epoxy-17α-hydroxy-1,4-pregnadiene-3,20-dione, (c) fluorinating the product of step (b) by reacting the product with hydrofluoric acid in an inert solvent to obtain 16β-methyl-9α-fluoro-11β,17α-dihydroxy-1,4-pregnadiene-3,20-dione, (d) diiodinating the product of step (c) by reacting the product with elemental iodine in an inert solvent in the presence of calcium oxide to obtain 16β - methyl - 9α - fluoro - 11β,17α - dihydroxy-21,21-diiodo-1,4-pregnadiene-3,20-dione, (e) acylating the product of step (d) in an inert solvent with an alkali or alkaline earth metal salt of a carboxylic acid selected from the group consisting of monocarboxylic acids of 2–16 carbon atoms, succinic acid and nicotinic acid, and (f) hydrolyzing the product of step (e) to obtain the compound of Formula I wherein R is hydrogen.

2. The process according to claim 1, wherein the inert solvents are selected from the group consisting of dioxane and tetrahydrofuran in step (a), methanol, ethanol, dichloromethane, chloroform and a mixture thereof in step (b), dichloromethane, chloroform, tetrahydrofuran, dimethylformamide, diethylformamide and water in the form of aqueous hydrofluoric acid having a concentration of at least 60% in step (c), methanol and a methanolic solution of calcium chloride in step (d) and acetone, dimethylformamide, diethylformamide, acetonitrile and a mixture thereof in step (e).

3. The process according to claim 1, wherein the reaction temperatures are −15 to 35° C. in step (a), 0 to 25° C. in step (b), −70 to 0° C. in step (c), 24 to 28° C. in step (d) and the boiling point of the solvent in step (e).

4. The process according to claim 1, wherein the reaction times are 1–6 hours in step (a), 1–4 hours in step (b), 1–5 hours in step (c), 1–2 hours in step (d) and 2–4 hours in step (e).

5. The process according to claim 1, wherein the salt used in step (e) is a potassium salt.

6. The process according to claim 1, wherein R is selected from the group consisting of acetyl, valeryl, isovaleryl, palmityl and nicotinyl.

7. The process according to claim 1, wherein step (e) is carried out at the reflux temperature of the reaction mixture and step (f) is carried out in a methanolic solution of sodium methoxide.

8. 16β-methyl - 9,11 - epoxy - 17α - hydroxy-1,4-pregnadiene-3,20-dione.

9. 16β - methyl - 9α - fluoro - 11β,17α - dihydroxy-21,21-diiodo-1,4-pregnadiene-3,20-dione.

References Cited

UNITED STATES PATENTS

| 3,104,245 | 9/1963 | Joly et al. | 260—397.45 |
| 3,119,815 | 1/1964 | Amiard et al. | 260—239.55 |
| 3,173,837 | 3/1965 | Von Werder et al. | 167—77 |
| 3,374,230 | 3/1968 | Gardner et al. | 260—239.55 |
| 3,375,261 | 3/1968 | Arth et al. | 260—397.45 |

HENRY A. FRENCH, Primary Examiner

U.S. Cl. X.R.

260—239.5, 397.45